US008824381B2

(12) United States Patent
Chaponniere

(10) Patent No.: US 8,824,381 B2
(45) Date of Patent: Sep. 2, 2014

(54) RELIABLE UPLINK RESOURCE REQUEST

(75) Inventor: Etienne F. Chaponniere, Rome (IT)

(73) Assignee: QUALCOMM Incorporated, San Diego, CA (US)

( * ) Notice: Subject to any disclaimer, the term of this patent is extended or adjusted under 35 U.S.C. 154(b) by 608 days.

(21) Appl. No.: 12/443,785

(22) PCT Filed: Oct. 31, 2007

(86) PCT No.: PCT/US2007/083244
§ 371 (c)(1),
(2), (4) Date: Jun. 30, 2009

(87) PCT Pub. No.: WO2008/055239
PCT Pub. Date: May 8, 2008

(65) Prior Publication Data
US 2010/0074193 A1 Mar. 25, 2010

Related U.S. Application Data

(60) Provisional application No. 60/863,794, filed on Oct. 31, 2006.

(51) Int. Cl.
H04W 72/00 (2009.01)
H04W 52/50 (2009.01)
H04W 74/08 (2009.01)
H04W 52/32 (2009.01)
H04L 1/00 (2006.01)

(52) U.S. Cl.
CPC .......... H04W 52/50 (2013.01); H04W 74/0866 (2013.01); H04W 52/32 (2013.01); H04L 1/0026 (2013.01)
USPC ........................................................ 370/329

(58) Field of Classification Search
None
See application file for complete search history.

(56) References Cited

U.S. PATENT DOCUMENTS

| 6,845,246 | B1 | 1/2005 | Steer | |
|---|---|---|---|---|
| 2003/0232622 | A1* | 12/2003 | Seo et al. | 455/437 |
| 2004/0160914 | A1 | 8/2004 | Sarkar | |
| 2006/0203765 | A1* | 9/2006 | Laroia et al. | 370/328 |
| 2006/0230765 | A1 | 10/2006 | Fedorov et al. | |
| 2008/0069031 | A1* | 3/2008 | Zhang et al. | 370/328 |
| 2009/0201885 | A1 | 8/2009 | Kuroda et al. | |

FOREIGN PATENT DOCUMENTS

| CN | 1383635 A | 12/2002 |
|---|---|---|
| EP | 1575234 | 9/2005 |
| JP | 2004040572 A | 2/2004 |

(Continued)

OTHER PUBLICATIONS

International Search Report and Written Opinion, PCT/US2007/083244, European Patent Office, Aug. 25, 2008.

(Continued)

Primary Examiner — Jae Y Lee
Assistant Examiner — Alan Lindenbaum
(74) Attorney, Agent, or Firm — Anthony R. Morris

(57) ABSTRACT

Systems and methodologies are described that facilitate reliably requesting uplink resources in a wireless communications environment. In particular, mechanisms are provided for reliable uplink resource requests at instants when uplink resources are not retained. A mobile device transmits an uplink resource request on a feedback information channel conventionally utilized for channel quality indicators. The mobile device utilizes specific codewords reserved for uplink requests. In addition, a power spectral density of the feedback information channel is boosted to lower an error rate of the channel when reserved codewords are transmitted.

42 Claims, 10 Drawing Sheets

(56) References Cited

FOREIGN PATENT DOCUMENTS

| JP | 2005505955 T | 2/2005 |
| JP | 2006033778 A | 2/2006 |
| RU | 2222207 C2 | 1/2004 |
| WO | 0199313 A1 | 12/2001 |
| WO | WO02095960 | 11/2002 |
| WO | 2005060132 | 6/2005 |
| WO | 2005125020 | 12/2005 |
| WO | WO2005125002 A2 | 12/2005 |
| WO | 2006043712 A1 | 4/2006 |
| WO | 2006043773 | 4/2006 |
| WO | WO2006042773 | 4/2006 |
| WO | 2006096887 | 9/2006 |

OTHER PUBLICATIONS

Taiwan Search Report—TW096141058—TIPO—Jun. 29, 2011.
Qualcomm Europe, "Scheduling Principles", 3GPP TSG-RAN WG2, Seoul, Korea, R2-062874, Oct. 9-13, 2006, pp. 1-6.

* cited by examiner

RELIABLE UPLINK RESOURCE REQUEST

CROSS-REFERENCE TO RELATED APPLICATIONS

This application claims the benefit of U.S. Provisional Patent application Ser. No. 60/863,794 entitled "RELIABLE UL RESOURCE REQUEST" which was filed Oct. 31, 2006. The entirety of the aforementioned application is herein incorporated by reference.

BACKGROUND

I. Field

The following description relates generally to wireless communications and, more particularly, to reliable requests for uplink resources.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

MIMO systems commonly employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, which may be referred to as spatial channels, where $N_S \leq \{N_T, N_R\}$. Each of the $N_S$ independent channels corresponds to a dimension. Moreover, MIMO systems may provide improved performance (e.g., increased spectral efficiency, higher throughput and/or greater reliability) if the additional dimensionalities created by the multiple transmit and received antennas are utilized.

MIMO systems may support various duplexing techniques to divide forward and reverse link communications over a common physical medium. For instance, frequency division duplex (FDD) systems may utilize disparate frequency regions for forward and reverse link communications. Further, in time division duplex (TDD) systems, forward and reverse link communications may employ a common frequency region. However, conventional techniques may provide limited or no feedback related to channel information.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Accordingly to an aspect, a method that facilitates obtaining resources in a wireless communications environment is described herein. The method can comprise transmitting an uplink resource request on a feedback information channel. In addition, the method can include increasing a power spectral density of the feedback information channel, wherein the increase improves reliability of the transmission.

Another aspect relates to a wireless communications apparatus that can comprise a memory that retains instructions related to transmitting an uplink resource request on a feedback information channel and increasing a power spectral density of the feedback information channel, the increase improves reliability of the transmission. The wireless communications apparatus can also include a processor coupled to the memory, configured to execute the instructions retained in the memory.

Yet another aspect relates to a wireless communications apparatus that facilitates obtaining resources in a wireless communications environment. The apparatus can comprise means for transmitting an uplink resource request on a feedback information channel. The apparatus can further include means for increasing a power spectral density of the feedback information channel, the increase improves reliability of the transmission.

Still another aspect relates to a machine-readable medium having stored thereon machine-executable instructions for transmitting an uplink resource request on a feedback information channel. The machine-readable medium can also include instructions for increasing a power spectral density of the feedback information channel, the increase improves reliability of the transmission.

According to another aspect, in a wireless communications system, an apparatus can comprise an integrated circuit. The integrated circuit can be configured to transmit an uplink resource request on a feedback information channel. The integrated circuit can further be configured to increase a power spectral density of the feedback information channel, the increase improves reliability of the transmission.

According to yet another aspect, a method that facilitates providing uplink resources in a wireless communications environment is described herein. The method can comprise identifying an uplink resource request on a feedback information channel. The method can also include scheduling resources with respect to one or more mobile devices based at least in part on the identified uplink resource request.

Another aspect described herein relates to a wireless communications apparatus that can include a memory that retains instructions related to identifying an uplink resource request on a feedback information channel and scheduling resources with respect to one or more mobile devices based at least in part on the identified uplink resource request. In addition, the wireless communications apparatus can comprise an integrated circuit coupled to the memory, configured to execute the instructions retained in the memory.

Yet another aspect relates to a wireless communications apparatus that facilitates providing uplink resources in a wireless communications environment. The apparatus can comprise means for identifying an uplink resource request on a feedback information channel. The apparatus can further include means for scheduling resources with respect to one or more mobile devices based at least in part on the identified uplink resource request.

Still another aspect relates to a machine-readable medium having stored thereon machine-executable instructions. The machine-readable medium can comprise instructions for identifying an uplink resource request on a feedback information channel. The machine-readable medium can further include instructions for scheduling resources with respect to one or more mobile devices based at least in part on the identified uplink resource request.

A further aspect described herein relates to an apparatus in a wireless communications system that can comprise an integrated circuit. The integrated circuit can be configured to identify an uplink resource request on a feedback information channel. In addition, the integrated circuit can be configured to schedule resources with respect to one or more mobile devices based at least in part on the identified uplink resource request.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
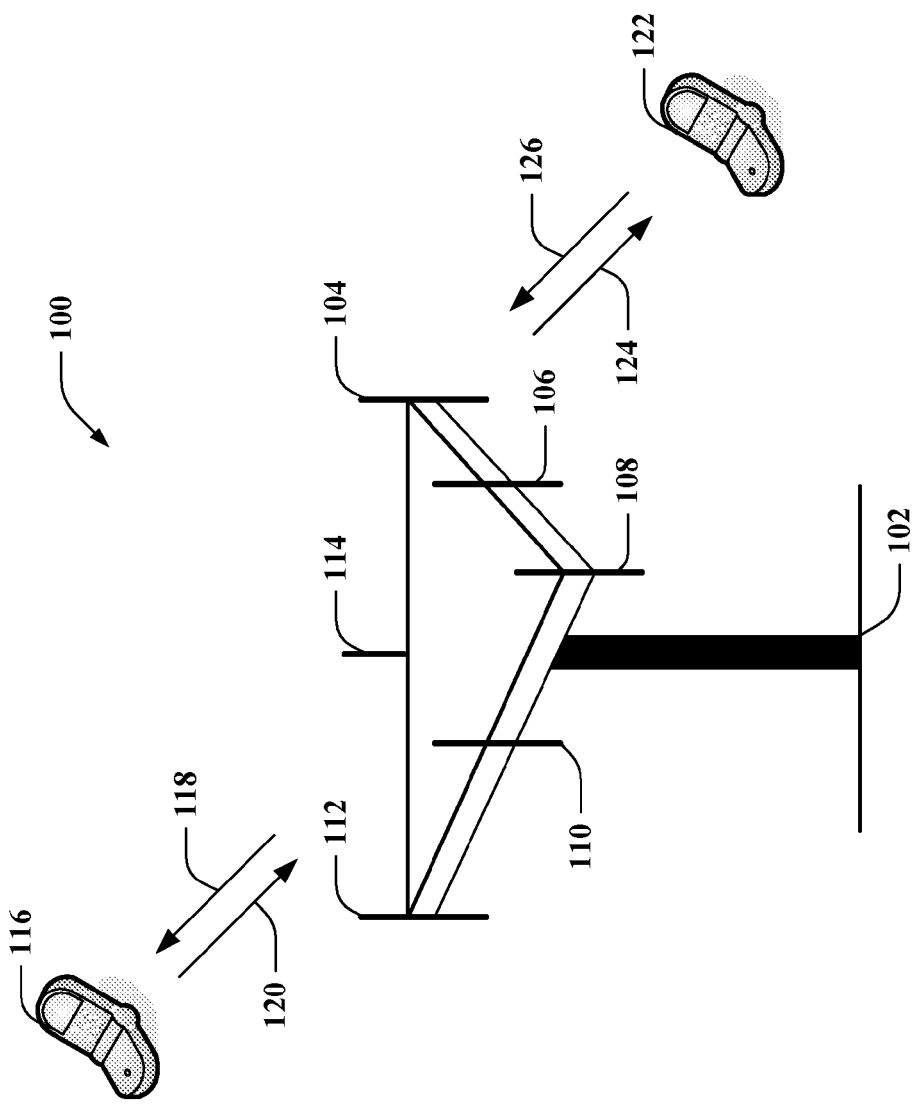
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring initially to FIG. 1, a wireless communication system 100 is illustrated in accordance with various embodiments presented herein. System 100 comprises a base station 102 that may include multiple antenna groups. For example, one antenna group may include antennas 104 and 106, another group may comprise antennas 108 and 110, and an additional group may include antennas 112 and 114. Two antennas are illustrated for each antenna group; however, more or fewer antennas may be utilized for each group. Base station 102 may additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 may communicate with one or more mobile devices such as mobile device 116 and mobile device 122; however, it is to be appreciated that base station 102 may communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link or downlink 118 and receive information from mobile device 116 over a reverse link or uplink 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 may utilize a different frequency band than that used by reverse link 120, and forward link 124 may employ a different frequency band than that employed by reverse link 126, for example. Further, in a time division duplex (TDD) system, forward link 118 and reverse link 120 may utilize a common frequency band and forward link 124 and reverse link 126 may utilize a common frequency band.

The set of antennas and/or the area in which they are designated to communicate may be referred to as a sector of base station 102. For example, multiple antennas may be designed to communicate to mobile devices in a sector of the areas covered by base station 102. In communication over forward links 118 and 124, the transmitting antennas of base station 102 may utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells may be subject to less interference as compared to a base station transmitting through a single antenna to all its mobile devices.

According to an example, system 100 may be a multiple-input multiple-output (MIMO) communication system. Further, system 100 may utilize any type of duplexing such as FDD, TDD, etc. Pursuant to an illustration, base station 102 may transmit over forward links 118 and 124 to mobile devices 116 and 122. Moreover, mobile devices 116 and 122 may estimate respective forward link or downlink channels and generate corresponding feedback that may be provided to base station 102 via reverse links or uplinks 120 and 122. As mentioned previously, mobile devices 116 and 122 can transmit information to base station 102 via reverse links 120 and 122. Typically, base station 102 schedules or assigns uplink resources to mobile devices 116 and 122 to be employed by the mobile devices in data transmissions. Base station 102 can utilize a plurality of scheduling techniques. For example, in a FDMA based system, two types of scheduling techniques are conventionally employed. In subband scheduling or frequency selective scheduling, user packets are mapped to tone allocations confined to a narrow bandwidth. In diversity scheduling or frequency hopped scheduling, user packets are mapped to tone allocations spanning the entire system bandwidth.

Mobile devices 116 and 122 can request uplink resources or request to be scheduled. However, it is difficult for mobile devices 116 and 122 to send requests when mobile devices 116 and 122 do not have uplink resources to begin with. Conventionally, separate physical channels can be provided to mobile device 116 and 122 wherein the separate physical channels are reserved for uplink requests. In addition, an uplink resource request can be transmitted in-band with data. This is possible under a universal mobile telecommunications system (UMTS); however, it would prove inefficient in long term evolution (LTE) as it is equivalent to reserving a dedicated resource. According to an aspect of the subject disclosure, mobile devices 116 and 122 can request uplink resources using a physical channel or other such channel conventionally allocated for other purposes. The request can be made utilizing reserved codewords on the allocated physical channel. Further, power of the reserved codewords is boosted so that the codewords are reliably received.

Figure 2:
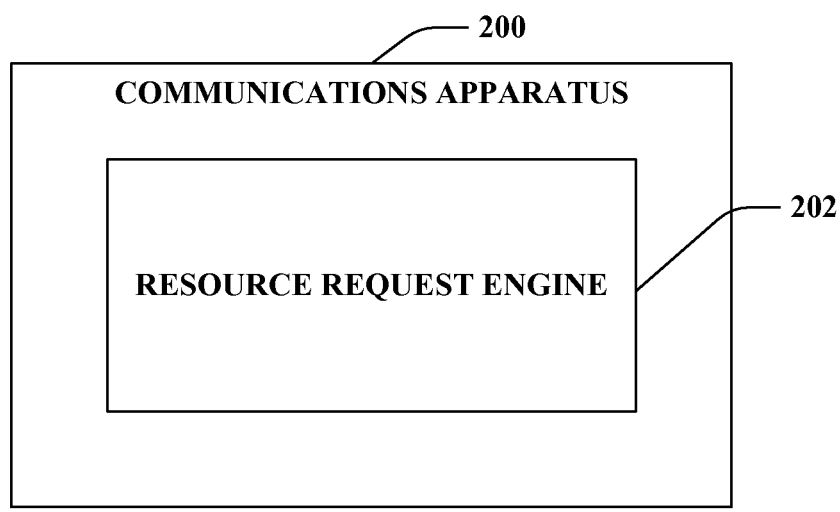
FIG. 2 is an illustration of an example communications apparatus for employment in a wireless communications system according to an aspect of the subject disclosure.

Turning now to FIG. 2, illustrated is a communications apparatus 200 for employment in a wireless communications environment. Communications apparatus 200 may be a base station or a portion thereof or a mobile device or a portion thereof. Communications apparatus 200 includes a resource request engine 202 that facilitates requesting and acquiring uplink resources for mobile devices or scheduling uplink resources. Resource request engine 202 facilitates requesting uplink resources when a mobile device does not have resources available. By way of example, communications apparatus 200 can be a mobile device. According to this illustration, resource request engine 202 can transmit an uplink resource request on a channel allocated for another purpose. In addition, resource request engine can increase a power spectral density (PSD) of the channel to improve reliability of the request transmission. The channel can be a feedback information channel such as, for example, a channel quality indicator (CQI) channel.

According to another example, communications apparatus 200 can be a base station. Pursuant to this illustration, resource request engine 202 of communications apparatus 200 can identify an uplink resource request from a mobile device on a channel conventionally allocated for a separate function. Further, resource request engine 202 can schedule resources for the mobile device based upon the identified uplink request and other requests received from a plurality of other mobile devices. The uplink resource request can include a codeword reserved for uplink resource requests sent on other channels. Mobile devices can transmit the reserved codeword to indicate a resource request and base stations can distinguish the uplink request from other information based upon the reserved codeword.

Moreover, although not shown, it is to be appreciated that communications apparatus 200 may include memory that retains instructions with respect to transmitting an uplink resource request on a feedback information channel, boosting power of the feedback information channel, reserving codewords for uplink resource requests, identifying requests on a feedback information channel, scheduling uplink resources, and the like. Further, communications apparatus 200 may include a processor that may be utilized in connection with executing instructions (e.g., instructions retained within memory, instructions obtained from a disparate source, . . . ).

Figure 3:
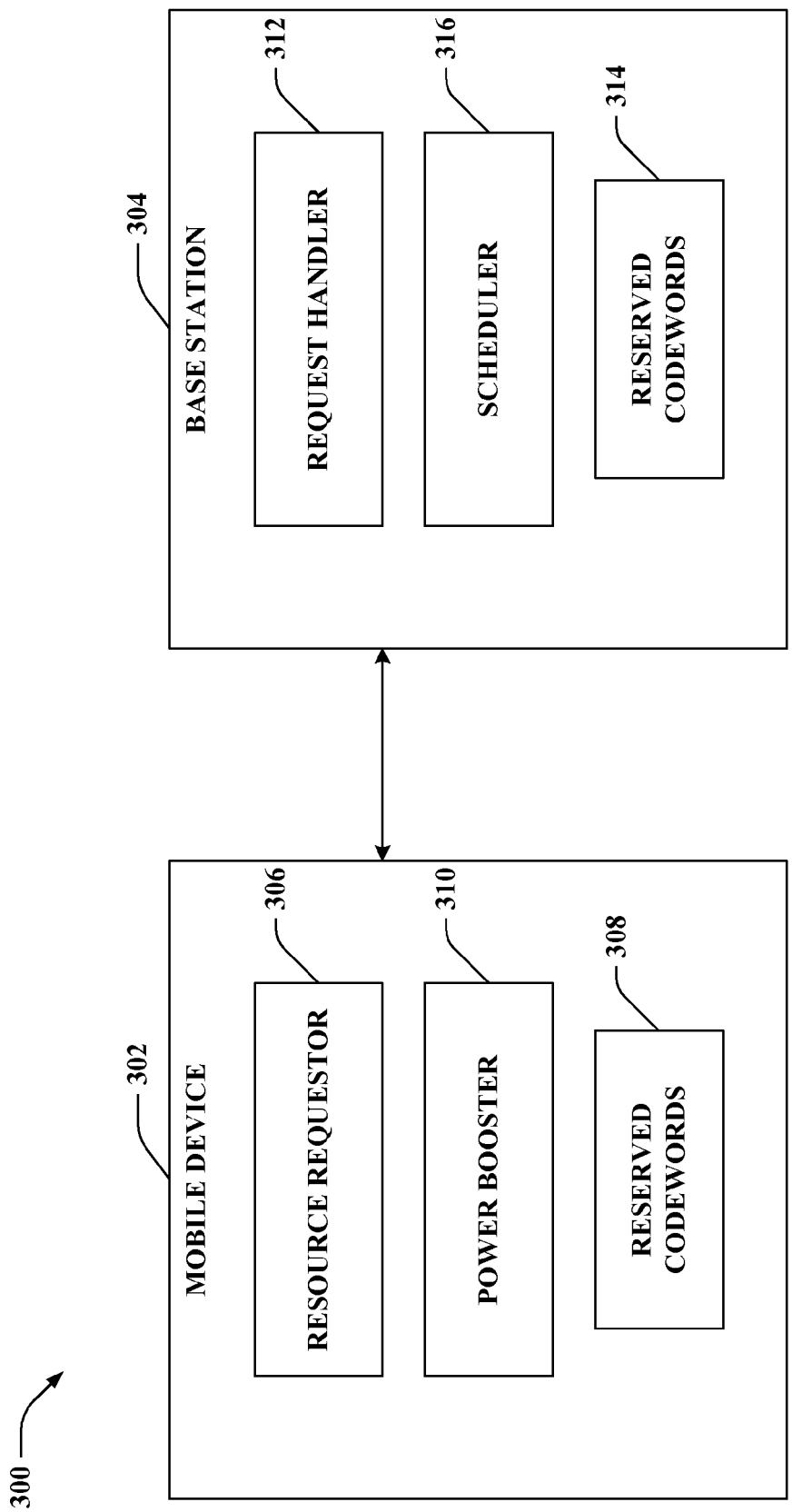
FIG. 3 is an illustration of a wireless communications system that facilitates reliable uplink resource requests in accordance with an aspect of the subject disclosure.

Referring to FIG. 3, illustrated is a wireless communications system 300 that facilitates reliable uplink resource requests. System 300 includes a base station 304 that communicates with a mobile device 302 (and/or any number of disparate mobile devices (not shown)). Base station 304 may transmit information to mobile device 302 over a forward link or downlink channel; further base station 304 may receive information from mobile device 302 over a reverse link or uplink channel. Moreover, system 300 may be a MIMO system.

Mobile device 302 includes a resource requestor 306 that facilitates requesting uplink resources from base station 304. Mobile device 302 can require uplink resources but have no current resources with which to utilize for a resource request. According to an aspect, a CQI channel can be allocated to mobile device 302. Mobile device 302 can employ the allocated CQI channel to request uplink resources. Resource requestor 306 can send an uplink resource request to base station 304 on the CQI channel. To distinguish the uplink resource request from typical channel feedback data, resource requestor 306 utilizes reserved codewords 308. The reserved codewords 308 represent uplink resource requests as opposed to channel feedback information or other data. The reserved codewords 308 can be stored in a memory (not shown) of mobile device 302. In addition, reserved codewords 308 can be generated by a processor when needed. For example, an algorithm can be employed that generates a reserved codeword when an uplink resource request is made.

During the periods when the reserved codewords 308 are transmitted on the CQI channel by mobile device 302, CQI information can be not sent to base station 304. Further, at instants when uplink resources are requires by mobile device 302, the CQI channel is providing information to base station 304 for downlink scheduling, power control, etc. At these times, the CQI information is not as essential to system operation and, accordingly, the CQI channel can be operated at a large erasure rate (e.g., 10 to 20 percent). However, the CQI channel needs to be more reliable if employed as an uplink resource request channel. Uplink requests transmitted by mobile device 302 must be reliably received by base station 304 as obtainment of uplink resources can be critical to system operation. According to one possibility, the CQI channel can be operated at a low erasure rate (e.g., 1 to 2 percent) to achieve a recommended reliability for uplink requests. However, this can present high uplink overhead that can prove too expensive.

Mobile device 302 includes a power booster 310 that facilitates increasing reliability of transmission of reserved codewords 308. Power booster 308 increases a PSD of the CQI channel when one of the reserved codeword 308 signifying an uplink resource request is transmitted on the channel. By adjusting the PSD of the CQI channel, the error rate or erasure rate of the channel can be configured based upon what information is transmitted on the channel. For example, the CQI channel operates at a lower PSD, and consequently a higher error rate, when CQI information utilized for downlink scheduling is to be sent. When uplink resource requests are transmitted, the CQI channel operates at a higher PSD, and subsequently a lower error rate so that the request can be reliably sent and received.

Base station 304 can include a request handler 312 and a scheduler 316. Request handler 312 can listen to data transmitted by mobile device. Request handler 312 identifies an uplink resource request from mobile device 302 or any other mobile device from a plurality of disparate mobile devices in communication with base station 304. The uplink resource request can be received on a feedback channel as opposed to a request channel or other such physical or logical channel of wireless communications system 300. The feedback channel can be a CQI channel typically employed to transmit channel quality information utilized in downlink scheduling. Request handler 312 can identify the uplink resource request on the CQI channel by detecting one codeword from among codewords 314 reserved for uplink resource requests. The reserved codewords 314 can be stored in a memory (not shown) of base station 304 and employed by request handler 312 for comparison to codewords received on the CQI channel. In addition, an algorithm can be included in base station 304 to generate the reserved codewords when needed. Moreover, base station 304 can include a processor and instructions that cause the processor to analyze received information on the CQI channel to identify one of the reserved codewords 314.

Base station 304 further includes a scheduler 316 that schedules or assigned uplink resources to mobile device 302. Scheduling decisions can be based in part on the uplink resource request identified by request handler 312. In addition, scheduler 316 can factor other resource requests received by base station 304. The other requests can be received via the CQI channel and handler by request handler 312 or the requests can be received by conventional means (e.g., uplink resource request channel). Scheduler 316 can employ algorithms (e.g., round robin, fair queuing, proportional fairness, and maximum throughput scheduling) and quantum algorithms (e.g., quantum genetic algorithm) to determine an optimal mode of operation for mobile device 302 and any number of disparate mobile devices. Once scheduled, base station 304 can transmit schedule information to mobile device 302 to enable the mobile device 302 to utilize the assigned uplink resources. The schedule information or resource assignment can include a data rate, a data rate offset, antenna subset selection for transmission, antenna pattern selection, a frequency assignment and the like.

Figure 4:
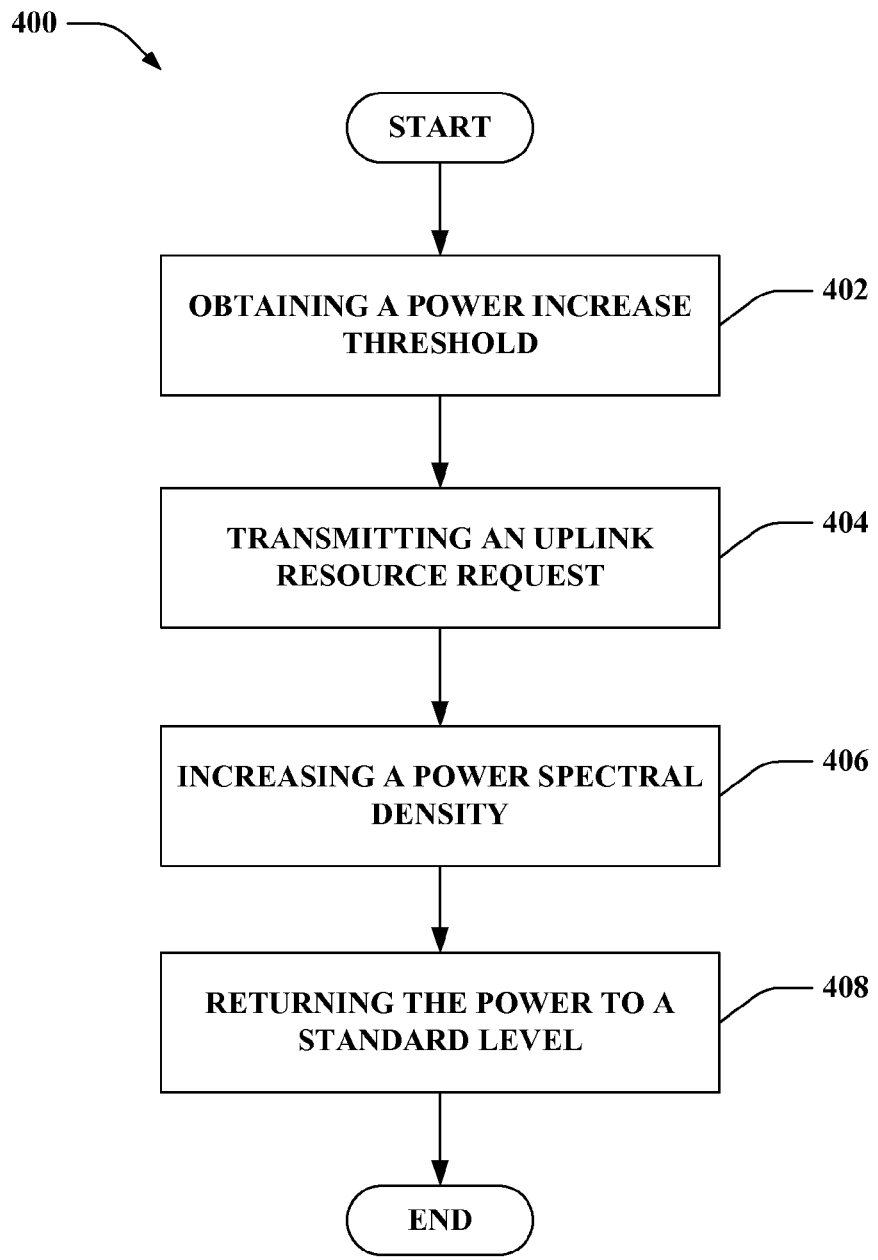
FIG. 4 is an illustration of an example methodology that facilitates reliably requesting uplink resources.
Figure 5:
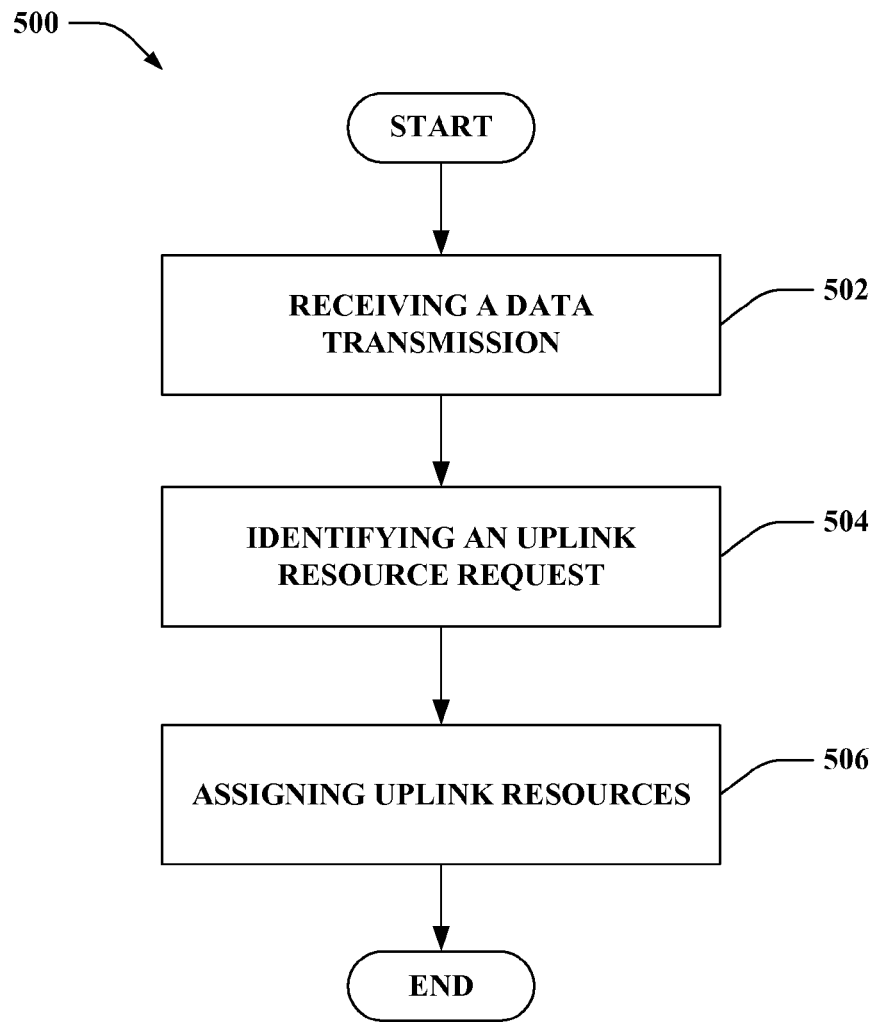
FIG. 5 is an illustration of an example methodology that facilitates providing uplink resources in a wireless communications environment.

Referring to FIGS. 4-5, methodologies relating to reliably transmitting uplink resource requests are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning now to FIG. 4, illustrated is a methodology 400 that facilitates reliably requesting uplink resources. Method 400 can be employed, among other things, to acquire uplink resources at times when resources are not presently retained. Method 400 can be implemented on a mobile device in a wireless communications system. At reference numeral 402, a power increase threshold is obtained. The power increase threshold is a value representing a magnitude of power boost required for an uplink request to achieve a desired error or erasure rate. For example, an error rate of one to two percent is recommended. At reference numeral 404, an uplink resource request is transmitted. The resource request can be transmitted on a feedback channel such as, for example, a channel quality indicator (CQI) channel. The resource request can comprise a reserved codeword that distinguishes an uplink resource request from CQI information on the CQI channel. At reference numeral 406, a PSD of the CQI channel is increased based at least in part on the obtained power increase threshold. The increased PSD lowers the error rate of the channel during transmission of the reserved codeword representing the uplink resource request. At numeral 408, the PSD of the CQI channel is returned to a standard level for transmission of CQI information.

Referring to FIG. 5, illustrated is a methodology 500 that facilitates assigning uplink resources in a wireless communications system. Method 500 can be employed, among other things, to assigned resources to requesting entities without resources. Method 500 can be implemented on a base station in a wireless communications system. At reference numeral 502, a data transmission is received. The data transmission can be received on a feedback channel such as, for example, a CQI channel. Data transmissions received on the CQI channel typically comprise channel quality information employed in downlink scheduling. However, in accordance with aspect of the subject disclosure, the CQI channel can be employed by mobile devices to transmit an uplink resource request. At reference numeral 504, an uplink resource request is identified in the received data transmission. Reserved codewords are utilized in the uplink resource request. The reserved codewords distinguish the resource request from CQI data typically transmitted on the channel. At reference numeral 506, uplink resources are assigned to the requesting entity. The assignment can be based at least in part on the identified resource request.

It will be appreciated that, in accordance with one or more aspects described herein, inferences can be made regarding whether uplink resources need to be requested, determining a power increase threshold, scheduling uplink resources, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to determining when to request uplink resources. By way of further illustration, an inference may be made related to selecting a power level threshold required t achieve a target error rate during transmission of the uplink resource request, etc. It will be appreciated that the foregoing examples are illustrative in nature and are not intended to limit the number of inferences that can be made or the manner in which such inferences are made in conjunction with the various embodiments and/or methods described herein.

Figure 6:
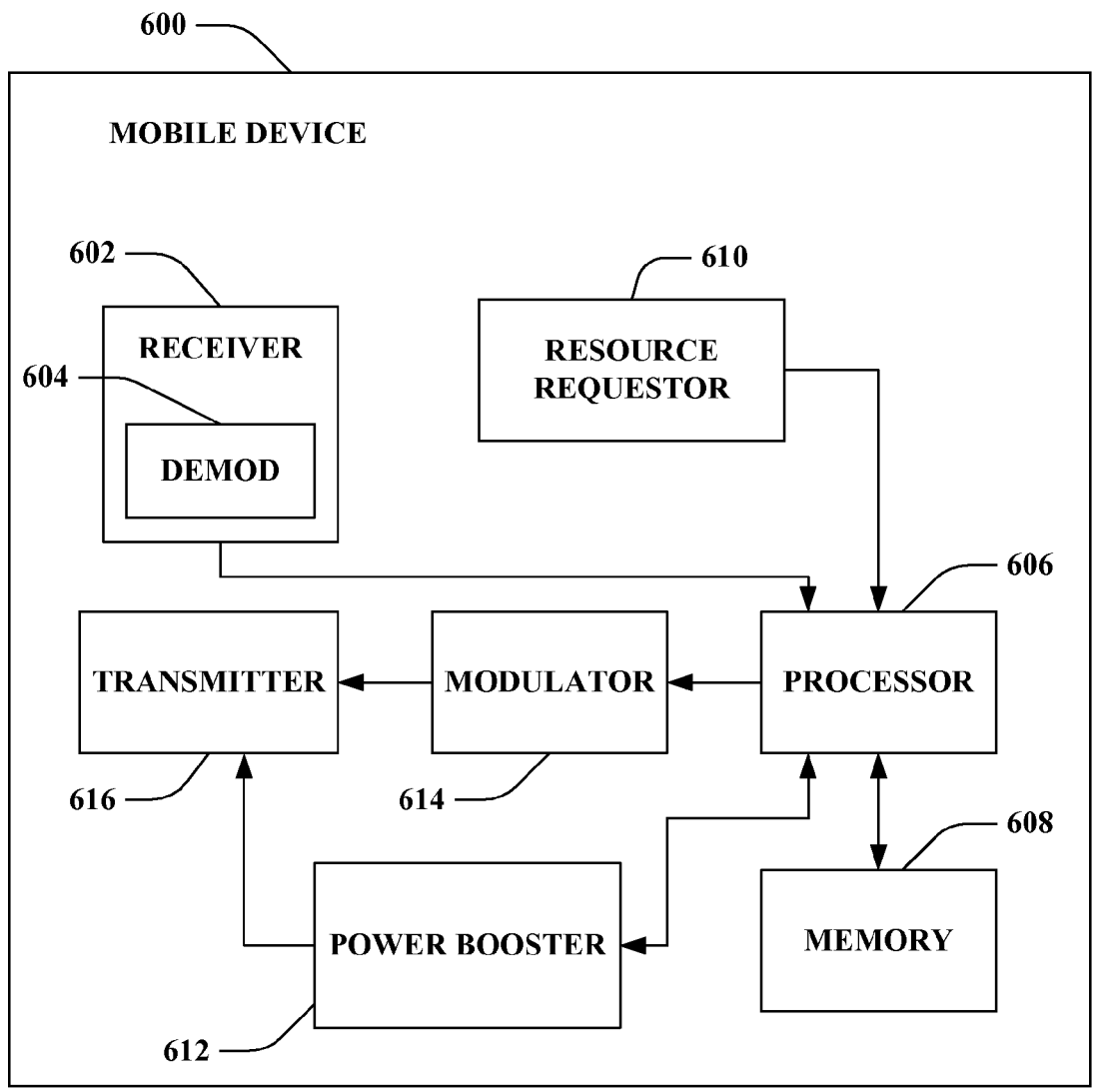
FIG. 6 is an illustration of an example mobile device that facilitates reliably requesting uplink resources.

FIG. 6 is an illustration of a mobile device 600 that facilitates reliably requesting uplink resources. Mobile device 600 comprises a receiver 602 that receives a signal from, for instance, a receive antenna (not shown), and performs typical actions thereon (e.g., filters, amplifies, downconverts, etc.) the received signal and digitizes the conditioned signal to obtain samples. Receiver 602 can be, for example, an MMSE receiver, and can comprise a demodulator 604 that can demodulate received symbols and provide them to a processor 606 for channel estimation. Processor 606 can be a processor dedicated to analyzing information received by receiver 602 and/or generating information for transmission by a transmitter 616, a processor that controls one or more components of mobile device 600, and/or a processor that both analyzes information received by receiver 602, generates information for transmission by transmitter 616, and controls one or more components of mobile device 600.

Mobile device 600 can additionally comprise memory 608 that is operatively coupled to processor 606 and that may store data to be transmitted, received data, information related to available channels, data associated with analyzed signal and/or interference strength, information related to an assigned channel, power, rate, or the like, and any other suitable information for estimating a channel and communicating via the channel. Memory 608 can additionally store protocols and/or algorithms associated with estimating and/or utilizing a channel (e.g., performance based, capacity based, etc.).

It will be appreciated that the data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 608 of the subject systems and methods is intended to comprise, without being limited to, these and any other suitable types of memory.

Processor 602 is further operatively coupled to a resource requestor 610 that facilitates transmitting an uplink resource request to a base station. Mobile device 600 can require uplink resources at times when no current resources are retained to make the request. Resource requestor 610 can employ another physical or logical channel to make the request. For example, a CQI channel can be utilized by resource requestor 610 to request uplink resources. Resource requestor 610 can send an uplink resource request to a base station on the CQI channel by transmitting reserved codewords. The reserved codewords represent uplink resource requests and are distinguishable from channel quality information typically transmitted on the channel. The reserved codewords can be stored in memory 608 of mobile device 600. In addition, it is to be appreciated that the reserved codewords can be generated as needed by processor 606. For example, an algorithm stored in memory 608 can be employed to generate a reserved codeword for an uplink resource request.

Mobile device 600 further includes a power booster 612 that facilitates increasing reliability of transmission of reserved codewords indicating the uplink resource request. Power booster 612 increases a PSD of the CQI channel when one of the reserved codeword is transmitted on the channel. By adjusting the PSD of the CQI channel, the error rate or erasure rate of the channel can be configured based upon what information is transmitted on the channel. For example, the CQI channel operates at a lower PSD, and consequently a higher error rate, when CQI information utilized for downlink scheduling is to be sent. When uplink resource requests are transmitted, the CQI channel operates at a higher PSD, and subsequently a lower error rate so that the request can be reliably sent and received. A power level threshold can be specified that determines the amount of power boost required.

This threshold value can be obtained from a base station and received by mobile device 600 by receiver 602. In addition, the threshold value can be stored in memory 608 or evaluated by processor 606 based upon parameters of the environment such as, for example, channel conditions, interference levels, etc. Subsequent to transmission of the reserved codewords, the PSD level can be returned to a standard level suitable for transmission of CQI information. Mobile device 600 still further comprises a modulator 614 and a transmitter 616 that transmits a signal (e.g., reserved codewords on the CQI channel) to, for instance, a base station, another mobile device, etc. Although depicted as being separate from the processor 606, it is to be appreciated that resource requestor 610, power booster 612 and/or modulator 614 may be part of processor 606 or a number of processors (not shown).

Figure 7:
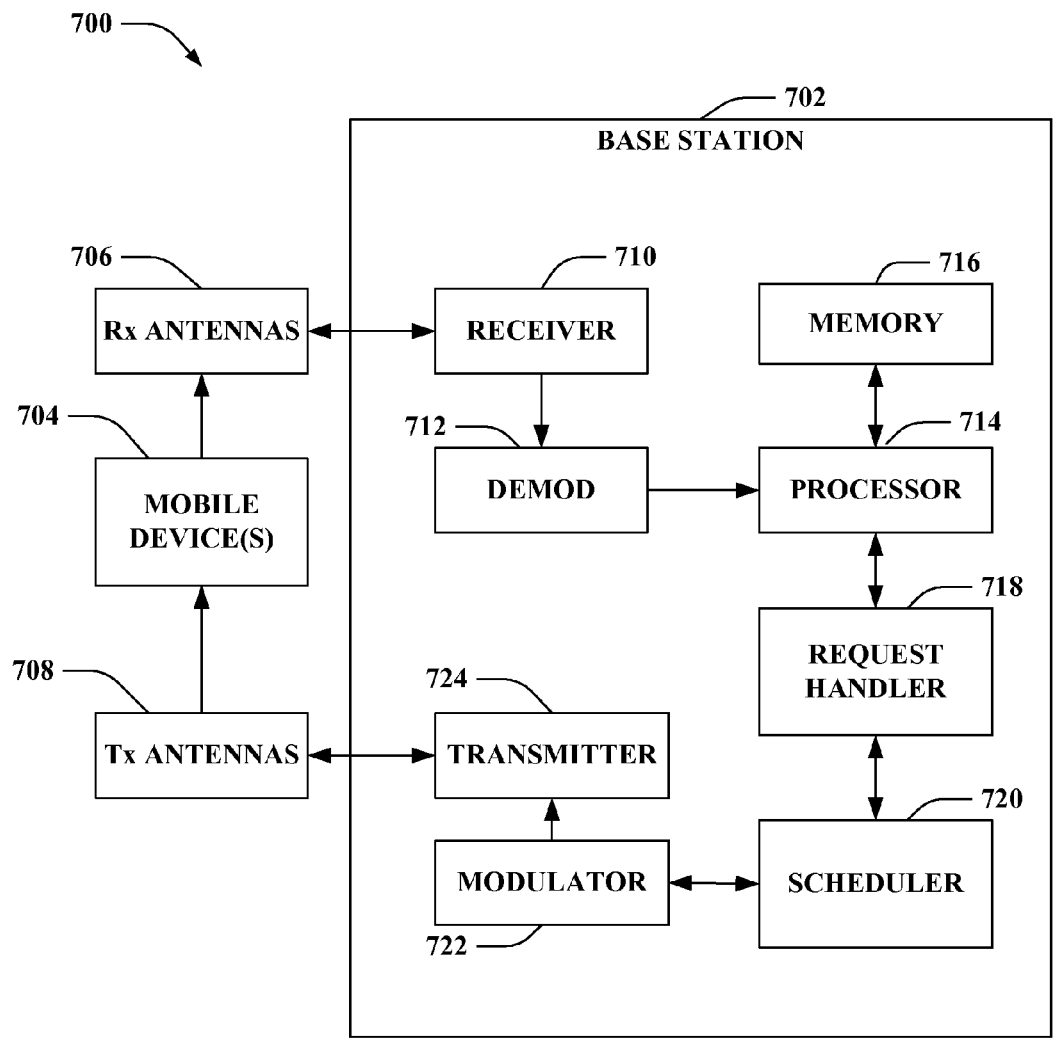
FIG. 7 is an illustration of an example system that facilitates providing uplink resources in a wireless communications environment.

FIG. 7 is an illustration of a system 700 that facilitates providing uplink resources in response to a request in a wireless communications environment. System 700 comprises a base station 702 (e.g., access point, . . . ) with a receiver 710 that receives signal(s) from one or more mobile devices 704 through a plurality of receive antennas 706, and a transmitter 722 that transmits to the one or more mobile devices 704 through a plurality of transmit antennas 708. Receiver 710 can receive information from receive antennas 706 and is operatively associated with a demodulator 712 that demodulates received information. Demodulated symbols are analyzed by a processor 714 that can be similar to the processor described above with regard to FIG. 6, and which is coupled to a memory 716 that stores information related to estimating a signal (e.g., pilot) strength and/or interference strength, data to be transmitted to or received from mobile device(s) 704 (or a disparate base station (not shown)), and/or any other suitable information related to performing the various actions and functions set forth herein.

Processor 714 is further coupled to a request handler 718 that identifies uplink resource requests from mobile devices 704 received by receive antennas 706 and receiver 710. The uplink resource request can be received on a feedback channel as opposed to a request channel or other such physical or logical channel of a wireless communications system. The feedback channel can be a CQI channel typically employed to transmit channel quality information utilized in downlink scheduling. Request handler 718 can detect one codeword from among a set of codewords reserved for uplink resource requests. The reserved codewords can be stored in memory 716 of employed by request handler 718 for comparison to codewords received on the CQI channel. In addition, an algorithm can be included in base station 702 to generate the reserved codewords when needed. Moreover, processor 714 can analyze received information on the CQI channel to identify one of the reserved codewords.

Base station 702 further includes a scheduler 720 that schedules or assigned uplink resources to mobile devices 704. Scheduling decisions can be based in part on the uplink resource request identified by request handler 718. Base station 702 can transmit schedule information to mobile devices 704 to enable the mobile devices 704 to utilize the assigned uplink resources. The schedule information or resource assignment can include a data rate, a data rate offset, antenna subset selection for transmission, antenna pattern selection, a frequency assignment and the like. Information to be transmitted may be provided to a modulator 722. Modulator 722 can multiplex the information for transmission by a transmitter 726 through antenna 708 to mobile device(s) 704. Although depicted as being separate from the processor 714, it is to be appreciated that request handler 718, scheduler 720 and/or modulator 722 may be part of processor 714 or a number of processors (not shown).

Figure 8:
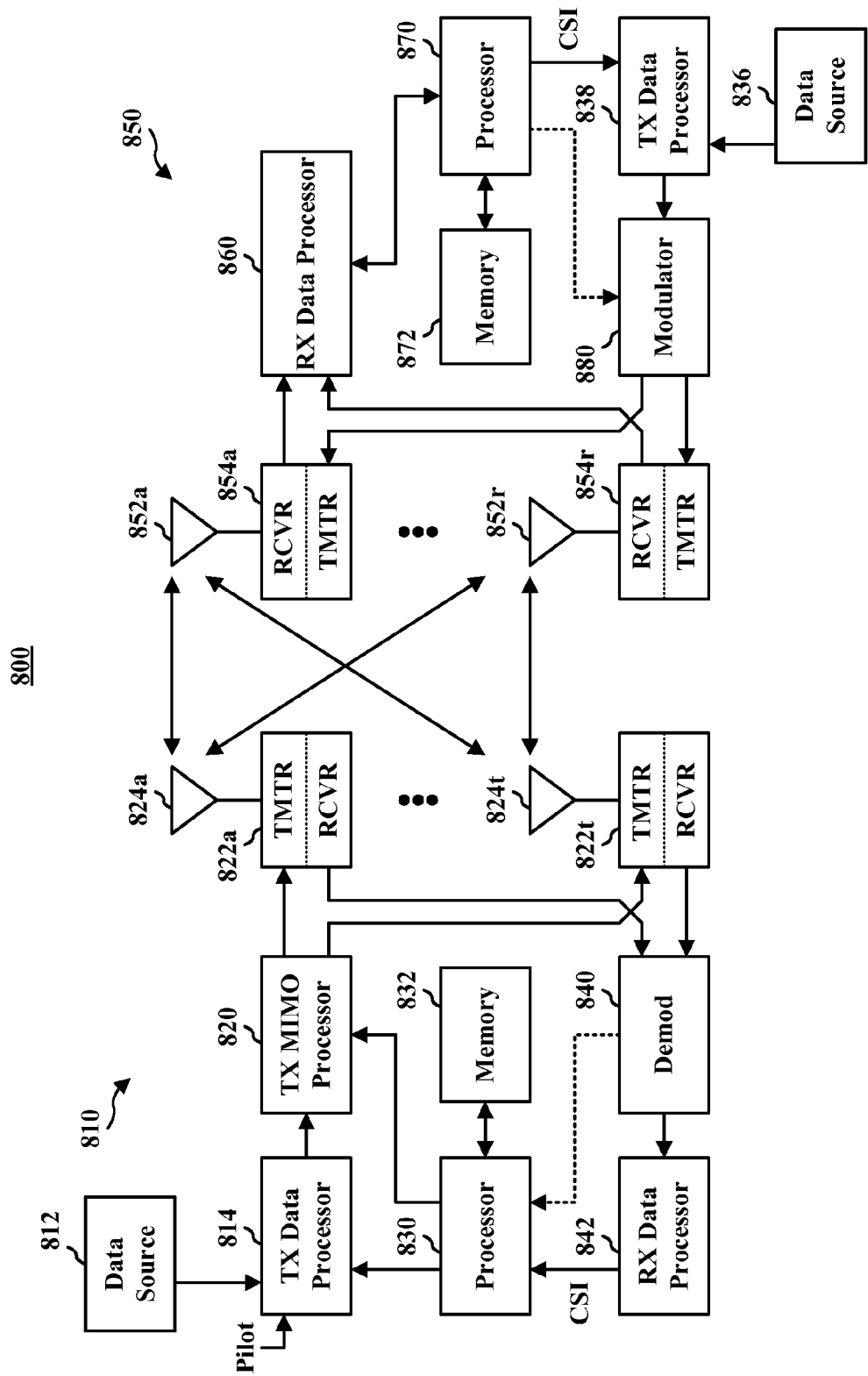
FIG. 8 is an illustration of an example wireless network environment that can be employed in conjunction with the various systems and methods described herein.

FIG. 8 shows an example wireless communication system 800. The wireless communication system 800 depicts one base station 810 and one mobile device 850 for sake of brevity. However, it is to be appreciated that system 800 may include more than one base station and/or more than one mobile device, wherein additional base stations and/or mobile devices may be substantially similar or different from example base station 810 and mobile device 850 described below. In addition, it is to be appreciated that base station 810 and/or mobile device 850 may employ the systems (FIGS. 1-3 and 6-7) and/or methods (FIGS. 4-5) described herein to facilitate wireless communication there between.

At base station 810, traffic data for a number of data streams is provided from a data source 812 to a transmit (TX) data processor 814. According to an example, each data stream may be transmitted over a respective antenna. TX data processor 814 formats, codes, and interleaves the traffic data stream based on a particular coding scheme selected for that data stream to provide coded data.

The coded data for each data stream may be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and may be used at mobile device 850 to estimate channel response. The multiplexed pilot and coded data for each data stream may be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream may be determined by instructions performed or provided by processor 830.

The modulation symbols for the data streams may be provided to a TX MIMO processor 820, which may further process the modulation symbols (e.g., for OFDM). TX MIMO processor 820 then provides $N_T$ modulation symbol streams to $N_T$ transmitters (TMTR) 822a through 822t. In various embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At mobile device 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 may receive and process the $N_R$ received symbol streams from $N_R$ receivers 854 based on a particular receiver processing technique to provide $N_T$ "detected" symbol streams. RX data processor 860 may demodulate, deinterleave, and decode each detected symbol stream to recover the traffic data for the data stream. The processing by RX data processor 860 is complementary to that performed by TX MIMO processor 820 and TX data processor 814 at base station 810.

A processor 870 may periodically determine which precoding matrix to utilize as discussed above. Further, processor 870 may formulate a reverse link message comprising a matrix index portion and a rank value portion.

The reverse link message may comprise various types of information regarding the communication link and/or the received data stream. The reverse link message may be processed by a TX data processor 838, which also receives traffic data for a number of data streams from a data source 836, modulated by a modulator 880, conditioned by transmitters 854a through 854r, and transmitted back to base station 810.

At base station 810, the modulated signals from mobile device 850 are received by antennas 824, conditioned by receivers 822, demodulated by a demodulator 840, and processed by a RX data processor 842 to extract the reverse link message transmitted by mobile device 850. Further, processor 830 may process the extracted message to determine which precoding matrix to use for determining the beamforming weights.

Processors 830 and 870 may direct (e.g., control, coordinate, manage, etc.) operation at base station 810 and mobile device 850, respectively. Respective processors 830 and 870 can be associated with memory 832 and 872 that store program codes and data. Processors 830 and 870 can also perform computations to derive frequency and impulse response estimates for the uplink and downlink, respectively.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 9:
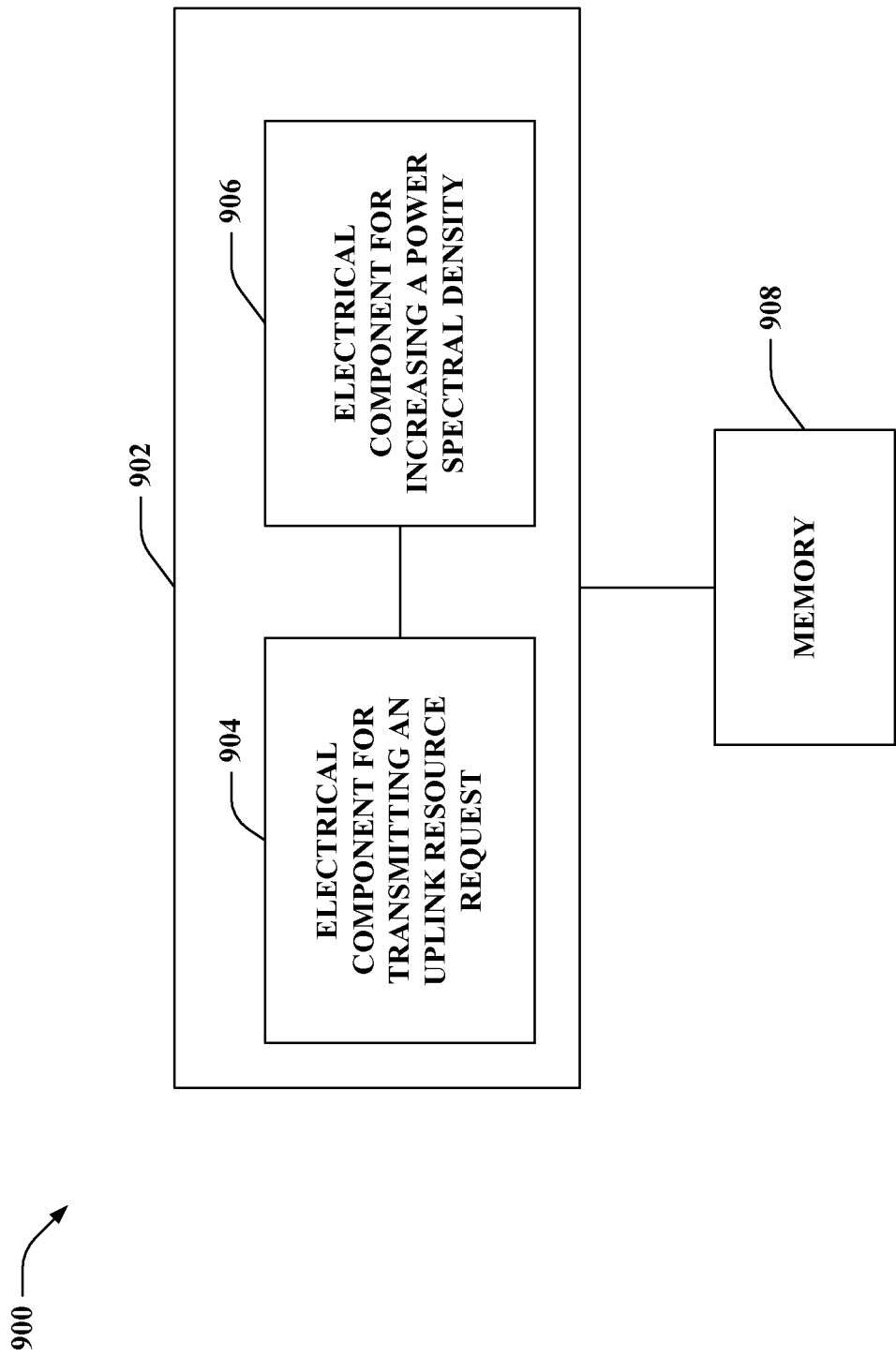
FIG. 9 is an illustration of an example system that facilitates reliably requesting uplink resources.

With reference to FIG. 9, illustrated is a system 900 that effectuates reliably requesting uplink resources in a wireless communications environment. For example, system 900 may reside at least partially within a mobile device. It is to be appreciated that system 900 is represented as including functional blocks, which may be functional blocks that represent functions implemented by a processor, software, or combination thereof (e.g., firmware). System 900 includes a logical grouping 902 of electrical components that can act in conjunction. For instance, logical grouping 902 may include an electrical component for transmitting an uplink resource request 904. The uplink resource request can be transmitted on a feedback information channel, for example, that conventionally conveys channel quality indicators to a base station for downlink scheduling. The uplink resource request can comprise at least one codeword from a set of reserved codewords. Further, logical grouping 902 may comprise an electrical component for increasing a power spectral density of a feedback information channel 906. The power spectral density of the CQI channel can be boosted when one of the reserved codeword is transmitted on the channel to achieve a target error rate lower than conventionally employed on the CQI channel conveying CQI information. By adjusting the power spectral density of the CQI channel, the error rate or erasure rate of the channel can be configured based upon what information is transmitted on the channel. Additionally, system 900 may include a memory 908 that retains instructions for executing functions associated with electrical components 904 and 906. While shown as being external to memory 908, it is to be understood that one or more of electrical components 904 and 906 may exist within memory 908.

Figure 10:
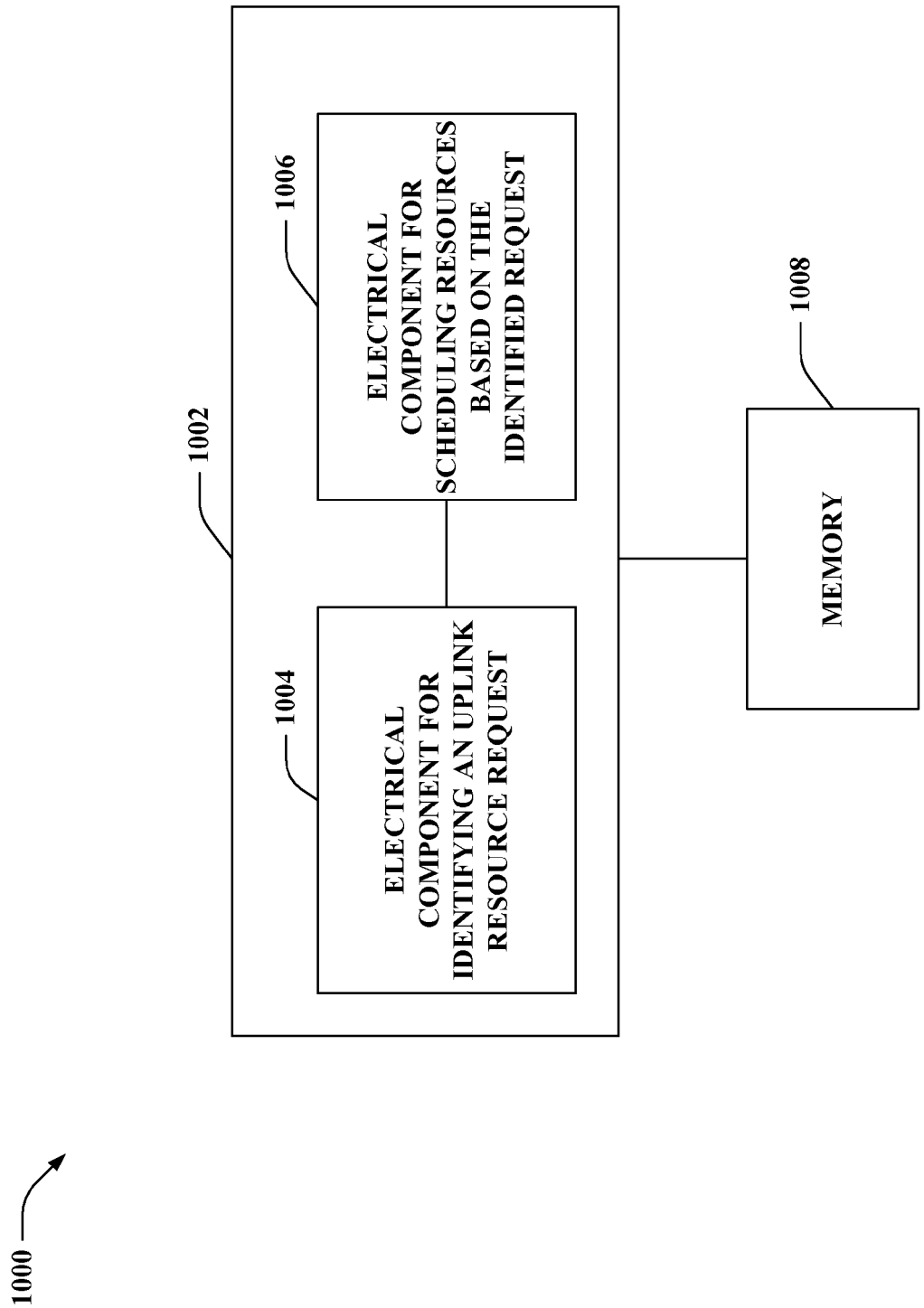
FIG. 10 is an illustration of an example system that facilitates providing uplink resources in a wireless communications environment.

Turning to FIG. 10, illustrated is a system 1000 that facilitates providing uplink resources in a wireless communications environment. System 1000 may reside within a base station, for instance. As depicted, system 1000 includes functional blocks that may represent functions implemented by a processor, software, or combination thereof (e.g., firmware). System 1000 includes a logical grouping 1002 of electrical components that facilitate controlling forward link transmission. Logical grouping 1002 may include an electrical component identifying an uplink resource request 1004. For example, a mobile device can transmit a request on a feedback information channel typically utilized for transmitting CQI information. The uplink resource request can be distinguished from CQI information by reserved codewords transmitted on the channel. Moreover, logical grouping 1002 may include an electrical component for scheduling resources based on the identified request 1006. Additionally, system 1000 may include a memory 1008 that retains instructions for executing functions associated with electrical components 1004, and 1006. While shown as being external to memory 1008, it is to be understood that electrical components 1004 and 1006 may exist within memory 1008.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   transmitting feedback information on a feedback information channel dedicated for the feedback information at a first power spectral density level;

determining that an uplink resource request is to be transmitted on the feedback information channel in response to determining that uplink resources are not available on a resource request channel;

transmitting the uplink resource request on the feedback information channel, wherein the uplink resource request is transmitted on the feedback information channel at a second power spectral density level higher than the first power spectral density level, wherein the second power spectral density level is selected in response to determining that the uplink resource request is to be transmitted on the feedback information channel and to lower an error rate of the feedback information channel during transmission of the uplink resource request; and reducing the power spectral density of the feedback information channel from the second power spectral density level subsequent to transmission of the uplink resource request and prior to transmitting feedback information on the feedback information channel.

2. The method of claim 1, further comprising reserving one or more codewords for uplink resource requests.

3. The method of claim 2, wherein transmitting the uplink resource request comprises sending at least one of the one or more reserved codewords on the feedback information channel, the one or more reserved codewords distinguishing the uplink resource request from feedback information.

4. The method of claim 1, further comprising obtaining a power level threshold value that represents a boost amount required to achieve a target error rate.

5. The method of claim 4, further comprising increasing the power spectral density from the first power spectral density level to the second power spectral density level by the boost amount.

6. The method of claim 1, wherein the feedback information channel is a channel quality information channel conventionally employed to transmit channel quality indicators.

7. A wireless communications apparatus, comprising:
a memory that retains instructions related to:
transmitting feedback information on a feedback information channel dedicated for the feedback information at a first power spectral density level;
determining that an uplink resource request is to be transmitted on the feedback information channel in response to determining that uplink resources are not available on a resource request channel;
transmitting the uplink resource request on the feedback information channel, wherein the uplink resource request is transmitted on the feedback information channel at a second power spectral density level higher than the first power spectral density level, wherein the second power spectral density level is selected in response to determining that the uplink resource request is to be transmitted on the feedback information channel and to lower an error rate of the feedback information channel during transmission of the uplink resource request; and
reducing the power spectral density of the feedback information channel from the second power spectral density level subsequent to transmission of the uplink resource request and prior to transmitting feedback information on the feedback information channel; and
a processor coupled to the memory, the processor configured to execute the instructions retained in the memory.

8. The wireless communications apparatus of claim 7, wherein the memory further retains instructions for reserving one or more codewords for uplink resource requests.

9. The wireless communications apparatus of claim 8, wherein the instructions related to transmitting the uplink resource request comprises instructions related to sending at least one of the one or more reserved codewords on the feedback information channel, the one or more reserved codewords distinguishing the uplink resource request from feedback information.

10. The wireless communications apparatus of claim 7, wherein the memory further retains instructions for obtaining a power level threshold value that represents a boost amount required to achieve a target error rate.

11. The wireless communications apparatus of claim 10, wherein the memory further retains instructions for increasing the power spectral density from the first power spectral density level to the second power spectral density level by the boost amount.

12. The wireless communications apparatus of claim 7, wherein the feedback information channel is a channel quality information channel conventionally employed to transmit channel quality indicators.

13. A wireless communications apparatus, comprising:
means for transmitting feedback information on a feedback information channel dedicated for the feedback information at a first power spectral density level;
means for determining that an uplink resource request is to be transmitted on the feedback information channel in response to determining that uplink resources are not available on a resource request channel;
means for transmitting the uplink resource request on the feedback information channel, wherein the uplink resource request is transmitted on the feedback information channel at a second power spectral density level higher than the first power spectral density level, wherein the second power spectral density level is selected in response to determining that the uplink resource request is to be transmitted on the feedback information channel and to lower an error rate of the feedback information channel during transmission of the uplink resource request; and
means for reducing the power spectral density of the feedback information channel from the second power spectral density level subsequent to transmission of the uplink resource request and prior to transmitting feedback information on the feedback information channel.

14. The wireless communications apparatus of claim 13, further comprising means for reserving one or more codewords for uplink resource requests.

15. The wireless communications apparatus of claim 14, wherein means for transmitting the uplink resource request comprises means for sending at least one of the one or more reserved codewords on the feedback information channel, the one or more reserved codewords distinguishing the uplink resource request from feedback information.

16. The wireless communications apparatus of claim 13, further comprising means for obtaining a power level threshold value that represents a boost amount required to achieve a target error rate.

17. The wireless communications apparatus of claim 16, further comprising means for increasing the power spectral density from the first power spectral density level to the second power spectral density level by the boost amount.

18. The wireless communications apparatus of claim 17, wherein the feedback information channel is a channel quality information channel conventionally employed to transmit channel quality indicators.

19. A non-transitory machine-readable medium having stored thereon machine-executable instructions for:
- transmitting feedback information on a feedback information channel dedicated for the feedback information at a first power spectral density level;
- determining that an uplink resource request is to be transmitted on the feedback information channel in response to determining that uplink resources are not available on a resource request channel;
- transmitting the uplink resource request on the feedback information channel, wherein the uplink resource request is transmitted on the feedback information channel at a second power spectral density level higher than the first power spectral density level, wherein the second power spectral density level is selected in response to determining that the uplink resource request is to be transmitted on the feedback information channel and to lower an error rate of the feedback information channel during transmission of the uplink resource request; and
- reducing the power spectral density of the feedback information channel from the second power spectral density level subsequent to transmission of the uplink resource request and prior to transmitting feedback information on the feedback information channel.

20. The machine-readable medium of claim 19, further comprising instructions for reserving one or more codewords for uplink resource requests.

21. The machine-readable medium of claim 20, wherein transmitting the uplink resource request comprises sending at least one of the one or more reserved codewords on the feedback information channel, the one or more reserved codewords distinguishing the uplink resource request from feedback information.

22. The machine-readable medium of claim 19, further comprising instructions for obtaining a power level threshold value that represents a boost amount required to achieve a target error rate.

23. The machine-readable medium of claim 22, further comprising increasing the power spectral density from the first power spectral density level to the second power spectral density level by the boost amount.

24. The machine-readable medium of claim 19, wherein the feedback information channel is a channel quality information channel conventionally employed to transmit channel quality indicators.

25. An apparatus, comprising:
an integrated circuit configured to:
- transmit feedback information on a feedback information channel dedicated for the feedback information at a first power spectral density level;
- determine that an uplink resource request is to be transmitted on the feedback information channel in response to determining that uplink resources are not available on a resource request channel;
- transmit the uplink resource request on the feedback information channel, wherein the uplink resource request is transmitted on the feedback information channel at a second power spectral density level higher than the first power spectral density level, wherein the second power spectral density level is selected in response to determining that the uplink resource request is to be transmitted on the feedback information channel and to lower an error rate of the feedback information channel during transmission of the uplink resource request; and
- reduce the power spectral density of the feedback information channel from the second power spectral density level subsequent to transmission of the uplink resource request and prior to transmitting feedback information on the feedback information channel.

26. A method, comprising:
- identifying feedback information on a feedback information channel dedicated for the feedback information, wherein the feedback information is characterized by a lower power spectral density level;
- identifying an uplink resource request on the feedback information channel received in response to a determination that uplink resources are not available to one or more mobile devices on a resource request channel, wherein the uplink resource request is characterized by higher power spectral density than the feedback information sent on the feedback information channel, the higher power spectral density being selected in response to a determination that the uplink resource request is to be transmitted on the feedback information channel; and
- scheduling resources with respect to the one or more mobile devices based at least in part on the identified uplink resource request.

27. The method of claim 26, further comprising receiving a data transmission on the feedback information channel.

28. The method of claim 26, wherein identifying the uplink resource request comprises recognizing at least one of a set of codewords reserved to represent uplink resource requests, the set of codewords distinguishing the uplink resource requests from feedback information.

29. The method of claim 26, wherein the feedback information channel is a channel quality information channel conventionally employed to transmit channel quality indicators.

30. A wireless communications apparatus, comprising:
a memory for:
- retaining instructions related to identifying feedback information on a feedback information channel dedicated for the feedback information, wherein the feedback information is characterized by a lower power spectral density level;
- retaining instructions related to identifying an uplink resource request on the feedback information channel received in response to a determination that uplink resources are not available to one or more mobile devices on a resource request channel, wherein the uplink resource request is characterized by higher power spectral density than the feedback information sent on the feedback information channel, the higher power spectral density being selected in response to a determination that the uplink resource request is to be transmitted on the feedback information channel; and
- retaining instructions related to scheduling resources with respect to the one or more mobile devices based at least in part on the identified uplink resource request; and
a processor coupled to the memory, the processor configured to execute the instructions retained in the memory.

31. The wireless communications apparatus of claim 30, wherein the memory is further for retaining instructions related to receiving a data transmission on the feedback information channel.

32. The wireless communications apparatus of claim 30, wherein identifying the uplink resource request comprises recognizing at least one of a set of codewords reserved to represent uplink resource requests, the set of codewords distinguishing the uplink resource requests from feedback information.

33. The wireless communications apparatus of claim 30, wherein the feedback information channel is a channel quality information channel conventionally employed to transmit channel quality indicators.

34. A wireless communications apparatus, comprising:
means for identifying feedback information on a feedback information channel dedicated for the feedback information, wherein the feedback information is characterized by a lower power spectral density level;
means for identifying an uplink resource request on the feedback information channel received in response to a determination that uplink resources are not available to one or more mobile devices on a resource request channel, wherein the uplink resource request is characterized by higher power spectral density than the feedback information sent on the feedback information channel, the higher power spectral density being selected in response to a determination that the uplink resource request is to be transmitted on the feedback information channel; and
means for scheduling resources with respect to the one or more mobile devices based at least in part on the identified uplink resource request.

35. The wireless communications apparatus of claim 34, further comprising means for receiving a data transmission on the feedback information channel.

36. The wireless communications apparatus of claim 34, wherein identifying the uplink resource request comprises recognizing at least one of a set of codewords reserved to represent uplink resource requests, the set of codewords distinguishing the uplink resource requests from feedback information.

37. The wireless communications apparatus of claim 34, wherein the feedback information channel is a channel quality information channel conventionally employed to transmit channel quality indicators.

38. A non-transitory machine-readable medium having stored thereon machine-executable instructions for:
identifying feedback information on a feedback information channel dedicated for the feedback information, wherein the feedback information is characterized by a lower power spectral density level;
identifying an uplink resource request on the feedback information channel received in response to a determination that uplink resources are not available to one or more mobile devices on a resource request channel, wherein the uplink resource request is characterized by higher power spectral density than the feedback information sent on the feedback information channel, the higher power spectral density being selected in response to a determination that the uplink resource request is to be transmitted on the feedback information channel; and
scheduling resources with respect to the one or more mobile devices based at least in part on the identified uplink resource request.

39. The machine-readable medium of claim 38, further comprising instructions for receiving a data transmission on the feedback information channel.

40. The machine-readable medium of claim 38, wherein identifying the uplink resource request comprises recognizing at least one of a set of codewords reserved to represent uplink resource requests, the set of codewords distinguishing the uplink resource requests from feedback information.

41. The machine-readable medium of claim 38, wherein the feedback information channel is a channel quality information channel conventionally employed to transmit channel quality indicators.

42. An apparatus, comprising:
an integrated circuit configured to:
identify feedback information on a feedback information channel dedicated for the feedback information, wherein the feedback information is characterized by a lower power spectral density level;
identify an uplink resource request on the feedback information channel received in response to a determination that uplink resources are not available to one or more mobile devices on a resource request channel, wherein the uplink resource request is characterized by higher power spectral density than the feedback information sent on the feedback information channel, the higher power spectral density being selected in response to a determination that the uplink resource request is to be transmitted on the feedback information channel; and
schedule resources with respect to the one or more mobile devices based at least in part on the identified uplink resource request.

* * * * *